United States Patent [19]

Daito

[11] Patent Number: 5,237,426

[45] Date of Patent: Aug. 17, 1993

[54] RECORD REGENERATIVE METHOD AND REGENERATIVE APPARATUS

[75] Inventor: Toshiji Daito, Tokorozawa, Japan

[73] Assignee: Pioneer Electronic Corporation, Tokyo, Japan

[21] Appl. No.: 648,318

[22] Filed: Jan. 29, 1991

Related U.S. Application Data

[63] Continuation-in-part of Ser. No. 599,514, Oct. 18, 1990, abandoned.

[30] Foreign Application Priority Data

Jan. 29, 1990 [JP] Japan ................................ 2-20039

[51] Int. Cl.⁵ .............................................. H04N 5/85
[52] U.S. Cl. .................................................. 358/342
[58] Field of Search ................ 360/27, 33.1, 35.1; 369/47, 48, 49, 59; 358/310, 335, 341, 342, 343

[56] References Cited

U.S. PATENT DOCUMENTS

| | | | |
|---|---|---|---|
| 4,809,087 | 2/1989 | Shimeki et al. | 360/27 |
| 4,905,077 | 2/1990 | Ishii | 358/335 |
| 5,016,113 | 5/1991 | Yamashita et al. | 358/335 |
| 5,047,868 | 9/1991 | Takeda et al. | 358/335 |

FOREIGN PATENT DOCUMENTS

| | | |
|---|---|---|
| 0268270 | 5/1988 | European Pat. Off. |
| 0339675 | 11/1989 | European Pat. Off. |
| 3619799 | 12/1987 | Fed. Rep. of Germany |
| 1234439 | 6/1971 | United Kingdom |
| 2096868 | 10/1982 | United Kingdom |

*Primary Examiner*—Donald E. McElheny, Jr.
*Attorney, Agent, or Firm*—Keck, Mahin & Cate

[57] ABSTRACT

Modulation signal carrying composite video signal representing a multiple frame composed of plural small frames corresponding to plural channels and modulation signal carrying digital graphics signal are subjected to frequency multiplexing, and the multiplex signal is recorded to single record medium utilizing its capacity effectively. During regenerating, one small frame and a frame of the graphics signal are displayed simultaneously. The invention relates to such record regenerative method and its apparatus.

5 Claims, 5 Drawing Sheets

RECORD REGENERATIVE METHOD AND REGENERATIVE APPARATUS

This application is a continuation-in-part of application Ser. No. 07/599,514, filed Oct. 18, 1990, now abandoned.

BACKGROUND OF THE INVENTION

1. Field of the Invention

V The present invention relates to record and regenerative method and a regenerative apparatus, wherein video information, audio information or the like is recorded and regenerated by means of a record medium such as a video disk or a magnetic tape.

2. Description of the Prior Art

In a system in the prior art, analog video signal outputted from disk player as a video regenerative device is added by digital video signal (hereinafter referred to as "graphics signal") thereby special regenerative image is obtained. In such a system, as shown in FIG. 1, graphics signal and audio signal ar previously stored by an external storage device 41 such as a floppy disk device, and audio signal from a video disk player 42 and the graphics signal and the audio signal from the external storage device 41 are supplied to a microcomputer 43 and processed, and video signal from the video disk player 42 is mixed with the graphics signal in a MIX circuit 44 and outputted whereas the audio signal is mixed in the microcomputer 43 and outputted.

However, since the storage medium such as a floppy disk in the external storage device is small in its storage capacity, in order to increase the information content such as graphic image or audio, a plurality of record media are required.

Also maximum recording time of the video disk in the prior art is about one hour in single face. In order to lengthen the maximm recording time, there are method of applying the compression processing to the video signal and the audio signal regarding frequency band or time and then recording the processed signal, and method of improving the record density of the record medium without the processing. However, in the former, a circuit of complicated constitution is required for the compression processing of the video signal, and particularly it cannot be easily realized from the aspect of the cost that the compression processing is performed while the quality of the video signal such as NTSC system is maintained. Also regarding the latter, the technical level to realize this method in practice is not yet attained in the present. Accordingly, it is not easy that the video signal and the audio signal in a plurality of channels are recorded and regenerated on single record medium without reducing the recording time.

SUMMARY OF THE INVENTION

In view of the above-mentioned points, an object of the invention is to provide record and regenerative method and a regenerative apparatus, wherein video signals of a plurality of channels can be recorded and regenerated by means of single record medium easily without reducing the recording time and graphic image can be added without using an external storage device exclusively.

The record and regenerative method according to the invention comprises step of forming first modulation signal carrying composite video signal representing a composite screen image composed of reduced frames each corresponding to a plurality of channels, step of forming second modulation signal carrying, digital graphics signal and forming a frequency-division multiplex signal by superposing first and second modulation signals with each other and recording the multiplex signal to a record medium, step of designating at least one channel among the plurality of channels during regenerating, step of extracting and demodulating the composite video signal and the graphics signal from the multiplex signal read from the record medium, and step of substituting the obtained graphics signal for a portion other than a reduced frame contained in the obtained composite video signal and corresponding to the designated channel.

A regenerative apparatus of the invention for playing a record medium recorded as mentioned above, which comprises means for designating at least one channel among a plurality of channels, means for extracting and demodulating composite video signal and graphics signal from multiplex signal read from a record medium, and means for substituting the obtained graphics signal for portion other than the reduced frame corresponding to the designated channel of the obtained composite video signal.

DETAILED DESCRIPTION OF A PREFERRED EMBODIMENT

An embodiment of the invention will now be described in detail referring to the accompanying drawings.

Figure 1:
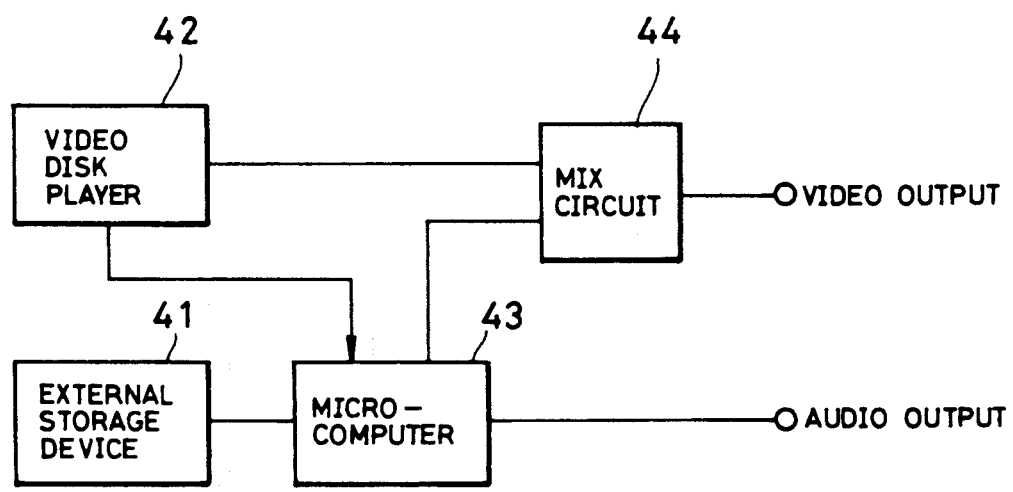
FIG. 1 is a block diagram showing a system with graphics image adding function in the prior art.
Figure 2:
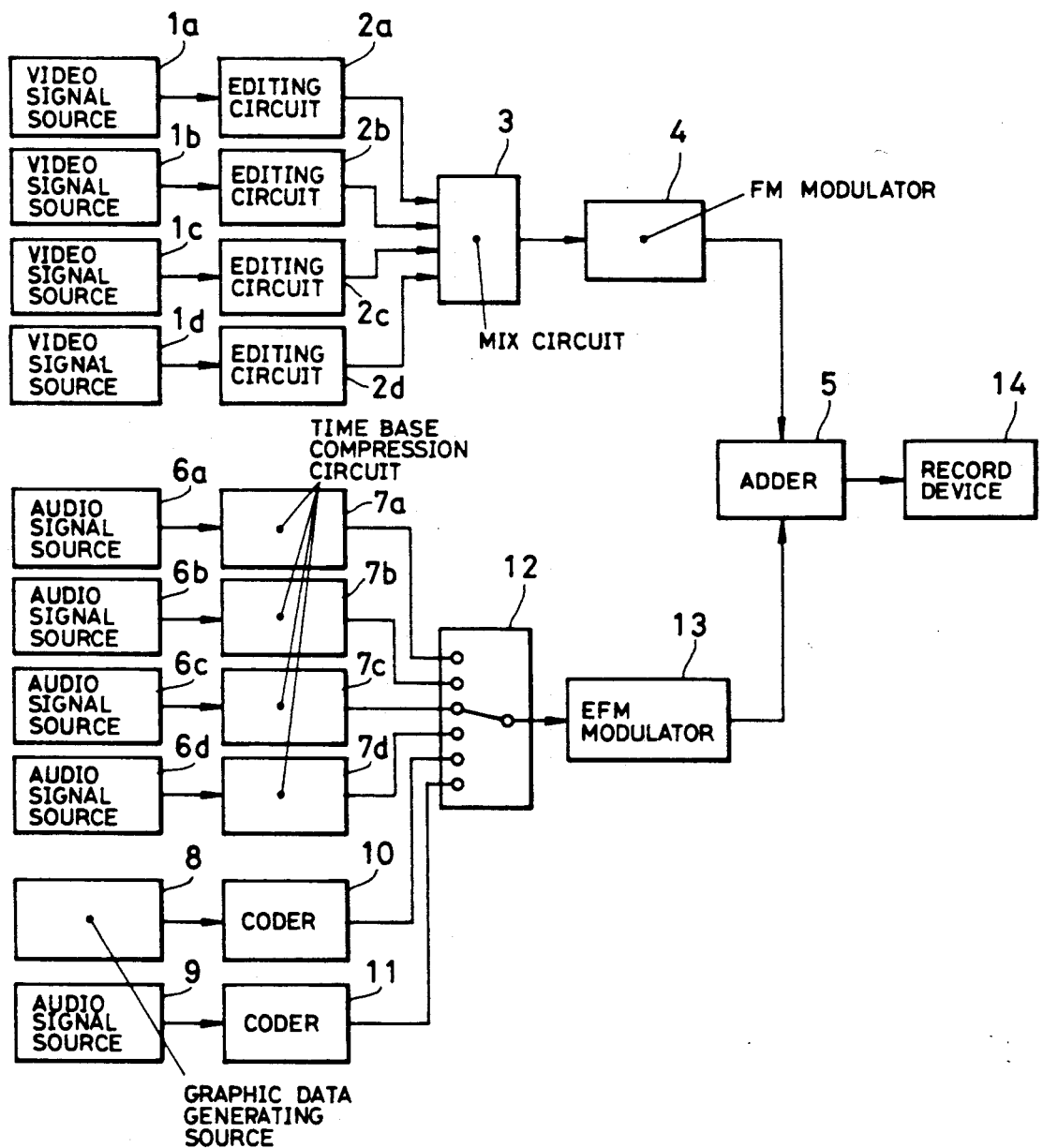
FIG. 2 is a block diagram showing a device performing record according to the invention.
Figure 4:
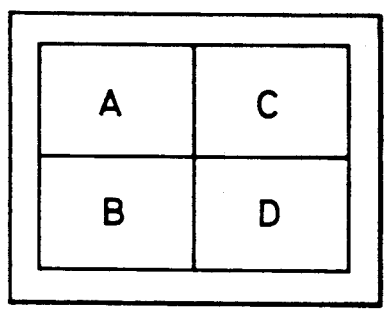
FIG. 4 is a diagram showing image by output video signal of a MIX circuit in the device in FIG. 2.

In FIG. 2, video signals of channels A through D are outputted from video signal sources $1a$ through $1d$ such as video tape recorders. Each of the video signal sources $1a$ through $1d$ is constituted to output composite video signal in synchronization with synchronous signal outputted, for example, from a synchronous signal generator (not shown). Video signals of the channels A through D outputted from the video signal sources $1a$ through $1d$ are supplied to editing circuits $2a$ through $2d$. Each of the editing circuits $2a$ through $2d$ reduces the supplied video signal into size of ¼ in one frame. A MIX circuit 3 is connected to outputs of the editing circuits $2a$ through $2d$. The MIX circuit 3 selectively inputs the output video signal of any one among the editing circuits $2a$ through $2d$ by output synchronous signals outputted, for example, from a synchronous signal generator (not shown) corresponding to position on 1H line, and prepares composite video signal so as to form one frame. A single H-line of the composite video signal issued from the MIX circuit 3 contains the video or picture signal from the circuit $1a$ at the former half portion thereof and the video signal from the circuit 1d at the latter half portion thereof as long as the H-line exists within an upper portion of a frame or field. When the H-line exists within a lower portion of a frame or field, it contains video signal from 1b and 1c at the former and latter portion thereof. The composite video signal is formed so that portions "A" through "D" in one frame shown in FIG. 4 can be displayed at reduced areas of one screen of a display when the composite video signal is reproduced on the particular screen.

Output of the MIX circuit 3 is supplied to to an FM modulator 4. In the FM modulator 4, frequency of carrier signal having prescribed frequency is modulated and video FM signal as first modulation signal is formed. The video FM signal is supplied to an adder 5.

On the other hand, audio signals of the channels A through D are outputted from audio signal sources 6a through 6d such as a tape recorder or the like. The audio signals of the channels A through D outputted from the audio signal sources 6a through 6d are supplied to audio time base compression and coding circuits 7a through 7d. The audio time base compression and coding circuits 7a through 7d generates digital data in response to sample value obtained, for example, by sampling audio signal in prescribed sampling frequency, and divides the digital data by reference timing signal outputted from a timing signal generator (not shown) and performs blocking while adding a block code to each block, and outputs the data per each block at the transfer speed being four times of that corresponding to the sampling frequency and performs the time base compression per each block. The data blocks from circuit 7a through 7d are, for example, disposed within the sub-code area of the so called CD-I format.

A graphic signal is outputted from a graphic data generating source 8 such as a microcomputer. Also a audio signal source 9 generates audio signal having no direct relation to the channels A through D but including, for example, the operation explanation for users as its content. Each of the graphic signal and the audio signal is coded in the so-called CD-ROW or CD-I format form in coders 10 and 11. The data issued from the coder 10 is graphic data disposed within the sub-code data. The data issued from the coder 11 is disposed within either one of the main-code and sub-code areas.

Each data block of the audio time base compression and coding circuits 7a through 7d and the coders 10, 11 is supplied to an audio multiplexing circuit 12. The audio multiplexing circuit 12 selectively outputs each block of blocked data outputted from the audio time base compression circuits 7a through 7d, for example, by the reference timing signal outputted from the timing signal generator (not shown) corresponding to the video block, or outputs the output data of any one of the coders 10, 11. The output of the audio multiplexing circuit 12 is supplied to an EFM modulator 13 and converted into EFM (Eight to Fourteen Modulation) signal as second and third digital modulation signals. The second digital modulation signal corresponds to the output data issued from the coding circuit 10 and formulated into the sub-code data of the CD-ROM or CD-I format. The third digital modulation signal corresponds to output data issued from one of the circuits 7a through 7d and the coder 11, and is, for example, comprised of data blocks each having a subheader formulated in the sub-code of the CD-I format. As is well known in the art, one "frame" in the CD-ROM or CD-I format signal includes a synchronous symbol (FS) of 24 bits, a sub-code symbol of 8 bits and 32 number of main code symbols of 256 bits, in sequence. It is also to be noted that the FM video signal exist, within a higher frequency region of 7.6 to 9.3 MHz and the EFM signal exists within a lower frequency region up to about 2 MHz. The output of the EFM modulator 13 is supplied to the adder 5 and added to the output of the FM modulator 4. The output of the adder 5 is supplied to a record device 14. The record device 14 is, for example, an optical video disk recorder as known well. In the record device 14, the output of the adder 5 is supplied to an optical modulator, and record track constituted by pits is formed, for example, on a recording surface of an original disk rotating at the frame period (1/30 sec).

Figure 3:
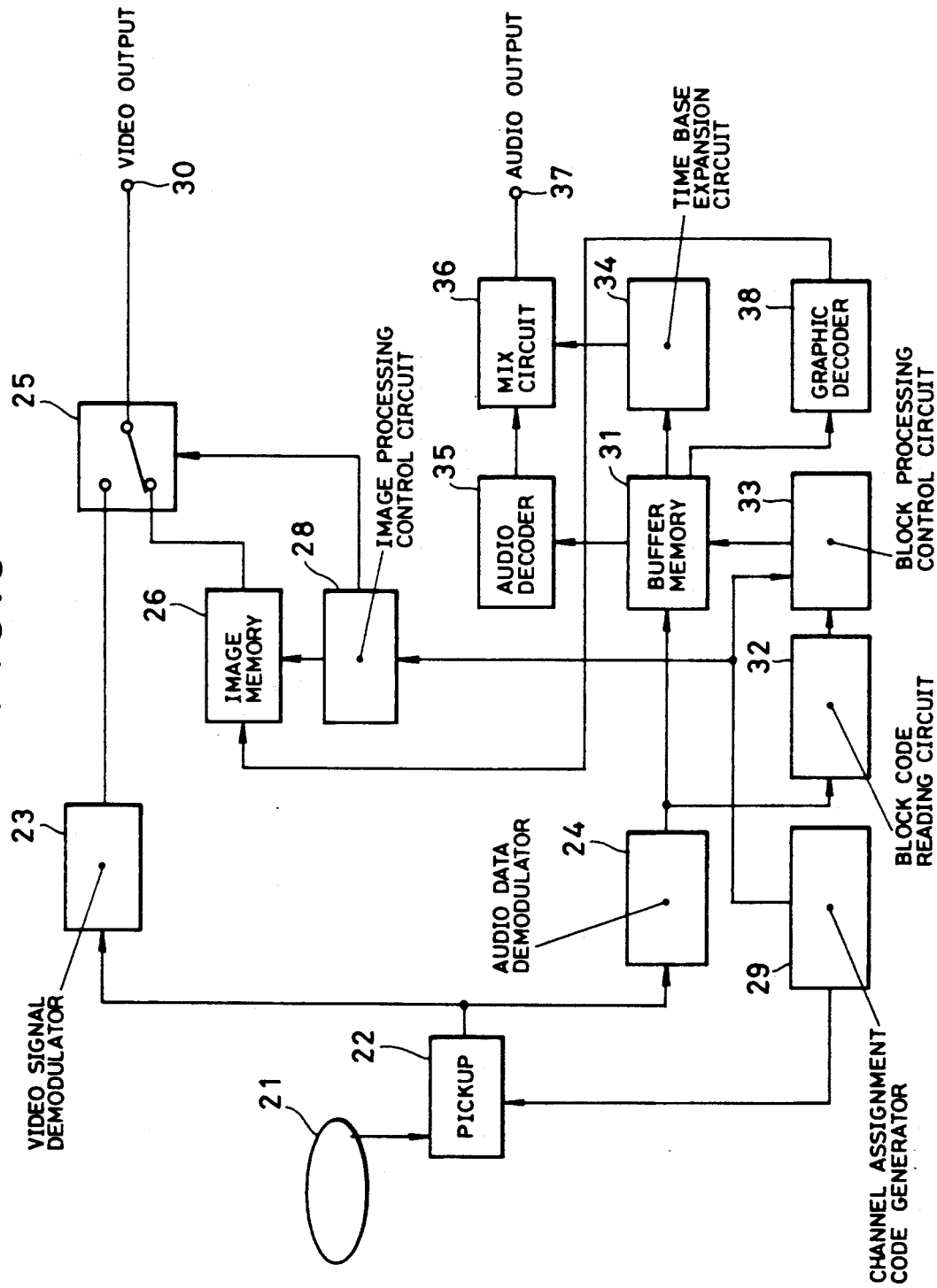
FIG. 3 is a block diagram showing a device for regenerating information recorded by the device in FIG. 2.

FIG. 3 shows a regenerative apparatus for regenerating the video signal and the audio signal from a reproduction disk reproduced by the original disk obtained as above described.

In FIG. 3, a disk 21 is driven for rotation by a motor (not shown) and a servo loop (not shown) in the frame period. The record information of the disk 21 is read by an optical pickup 22. The pickup 22 is provided with a laser diode, an actuator for focusing the light beam projected from the laser diode onto the recording surface of the disk, and an actuator for controlling the position of the focal point of the light beam in the radial direction of the disk. A servo loop is installed in the apparatus to control to drive various sorts of actuators of the pickup 22. However, such a servo loop is not particularly required for the description and therefore omitted in the figure. In addition, control of the action that the pickup is started or stopped by a key operation in an operation section such as a key board (not shown).

The read output of the pickup 22 is supplied to a video signal demodulator 23 and a data demodulator 24. The video signal demodulator 23 is constituted, for example, by a band pass filter for extracting the video FM signal component from the read output of the pickup 22 and an FM demodulator performing the demodulating processing of the output of the band pass filter. Also the data demodulator 24 is constituted, for example, by a low pass filter for extracting the audio EFM signal component from the read output of the pickup 22 and an EFM demodulator performing the demodulation processing of the output of the low pass filter.

The video signal is demodulated by the video signal demodulator 23 and supplied to one input terminal of a signal changer 25. Output of an image memory 26 is connected to other input terminal of the signal changer 25. Channel assignment code outputted from a channel assignment code generator 29 is supplied to an image processing control circuit 28. The channel assignment code generator 29 generates code indicating the channel assigned or designated, for example, by key operation of the operation section. The image processing control circuit 28 discriminates the channel area in 1H where the video signal of the channel assigned by the channel assignment code and the horizontal synchronous signal in the video signal is inserted, and performs the address control of the image memory 26 so that the video signal indicating a masking pattern carried by the digital graphic signal is written in the image memory 26 and then read out repeatedly at the that corresponding to the disappearance of the particular channel area, and generates the changing command signal at starting of reading of the image memory 26.

The video signal read from the image memory 26 is supplied to other input terminal of the signal changer 25. The signal changer 25 selectively outputs one of the video signal outputted from the video signal demodulator 23 by the changing command signal outputted from the image processing control circuit 28 and the video signal read from the image memory 26. The output of the signal changer 25 is supplied to a video output terminal 30.

On the other hand, the blocked data is demodulated by the data demodulator 24 and supplied to a buffer memory 31 and a block code reading circuit 32. The block code reading circuit 32 reads the block code in sequence, for example, in the blocked audio data and the graphic data. The block code oubputted from bhe block code reading circuit 32 is supplied to a block processing control circuit 33. Channel assignment code outputted from a channel assignment code generator 29 is supplied to the block processing control circuit 33. The block processing control circuit 33 discriminates the block where the audio data or the graphic data of the channel assigned by the block code and the channel assignment code is inserted, and performs the address control of the buffer memory 31 so that the audio data or the graphic data of the corresponding block is written in the buffer memory 31 and then read out.

When the audio data read from the buffer memory 31 is that of the channel assigned by the channel assignment code, the audio data is supplied to a time base expansion circuit 34. The time base expansion circuit 34 performs the time base expansion of the audio data four times for example. On the other hand, when the audio data read from the buffer memory 31 is the coded data, the audio data is supplied to a audio decoder 35 and decoded into audio signal. Outputs of the time base expansion circuit 34 and the audio decoder 35 are mixed in a MIX circuit 36 and supplied to a audio output terminal 37. When the data read from the buffer memory 31 is the graphic data, the graphic data is supplied to a graphic decoder 38. The coded graphic data is decoded into graphics signal, which is supplied to the image memory 26.

Figure 5A:
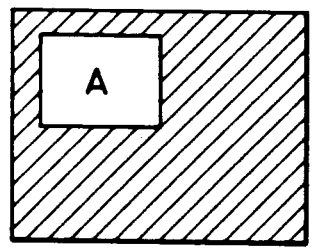
FIGS. 5 (A)-(D) are diagrams showing image by changing function of a signal changer in the device in FIG. 3.
Figure 5B:
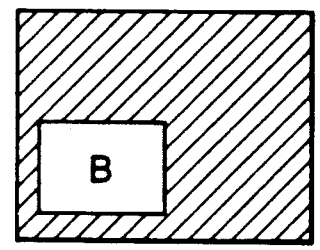
Figure 5C:
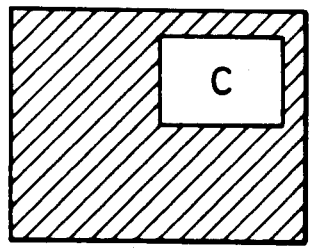
Figure 5D:
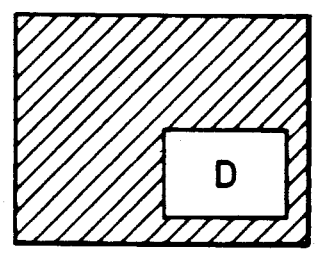

The signal changer 25 supplies the video signal from the video signal demodulator 23 to the video output terminal 30 only during period that the video signal of the assigned channel among 1H is supplied. Consequently, when the assigned channel is the channel A, the image of the channel A is displayed to the left upward portion in the frame as shown in FIG. 5(A), and when the assigned channel is the channel B, the image of the channel B is displayed to the left downward portion in the frame as shown in FIG. 5(B), and when the assigned channel is the channel C, the image of the channel C is displayed to the right upward portion in the frame as shown in FIG. 5(C), and further when the assigned channel is the channel D, the image of the channel D is displayed to the right downward portion in the frame as shown in FIG. 5(D). The video signal including the graphic signal read from the image memory 26 is substituted for portion other than the image portion (hatched portion in FIG. 5).

Figure 6A:
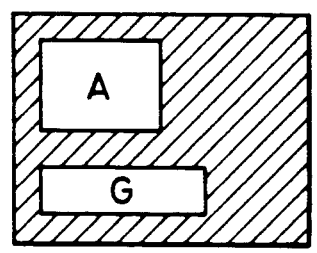
FIGS. 6(A) and (B) are diagrams showing position relation between image of each channel and graphic image.
Figure 6B:
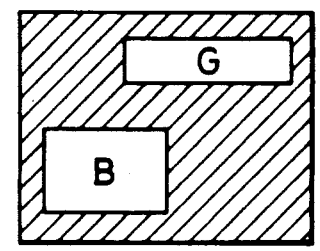

In the image processing control circuit 28, in response to changing of the assigned channel, the data of the image memory 26 is rewritten so that the graphic portion is not overlapped with the image portion of the assigned channel. For example, when the assigned channel is changed from the state of the channel A to the state of the channel B, if the graphics portion G in the frame in the state of the channel A shown in FIG. 6(A) is positioned to the left downward portion, at the changing to the state of the channel B, the graphics portion G in the frame in the state of the channel B shown in FIG. 6(B) is positioned to the right upward portion.

In the invention as above described in detail, first modulation signal carrying composite video signal representing a multiple frame constituted by small frames corresponding to a plurality of channels is formed, and second modulation signal carrying tbe digital graphics signal is formed and frequency multiplexing of the second modulation signal to the first modulation signal is formed thereby multiplex signal is formed and recorded to a record medium. During regenerating, at least one channel among a plurality of channels is assigned, and the composite video signal and the graphics signal are extracted and demodulated from the multiplex signal read from the record medium, and the obtained graphics signal is substituted for portion other than that corresponding to the assigned channel of the obtained composite video signal. According to the invention, since different region on the display frame is assigned to the video information of a plurality of channels thereby the video signal is formed and recorded and regenerated to the record medium, the video information of the plurality of channels can be included in one video signal, i.e. , track. Thereby the capacity of the record medium can be utilized effectively.

What is claimed is:

1. A record and reproduction method comprising the steps of:
    forming a first modulation signal carrying a composite video signal representing a screen image composed of reduced frames corresponding to a plurality of channels;
    forming a second modulation signal carrying a digital graphics signal and forming a frequency-division multiplex signal by superposing the first and the second modulation signals and recording the frequency-division multiplex signal to the record medium;
    assigning at least one channel among the plurality of channels during reproduction;
    extracting and demodulating the composite video signal and the graphics signal from the frequency-division multiplex signal read from the record medium; and
    substituting the obtained graphics signal for portion other than a reduced frame corresponding to the assigned channel of the obtained composite video signal.

2. The record and reproduction method as set forth in claim 1, wherein said first modulation signal is signal obtained by FM modulation of a high frequency carrier signal by said composite video signal, and said second modulation signal is signal obtained by EFM modulation of a CD-ROM or a CD-I format signal including said digital graphics signal.

3. The record and reproduction method as set forth in claim 1, wherein said frequency-division multiplex signal includes a third modulation signal carrying audio corresponding to the composite video signal of the plurality of channels.

4. The record and reproduction method as set forth in claim 2, wherein said CD-ROM or CD-I format signal includes an audio signal different than that of the composite video signal.

5. A reproduction apparatus for playing a recording medium on which a frequency-division multiplex signal is recorded comprised of a composite video signal having a plurality of channels and a digital graphics signal the apparatus comprising:

means for designating at least one channel among said plurality of channels of said composite video signal;

means for extracting and demodulating said composite video signal and graphics signal from said frequency-division multiplex signal read from the record medium; and signal substitution means for substituting said graphics signal for a portion other than that corresponding to the designated channel of said composite video signal obtained by said means for extracting and demodulating.

* * * * *